United States Patent [19]

Dreiling

[11] Patent Number: 4,527,337
[45] Date of Patent: Jul. 9, 1985

[54] FRAMING STUD TEMPLATE

[76] Inventor: Cletus F. Dreiling, Box 38, Rte. 2, Herrells' Trailer Park, Garden City, Kans. 67846

[21] Appl. No.: 476,998
[22] Filed: Mar. 21, 1983
[51] Int. Cl.³ .............................. G01B 3/30; G01B 5/14
[52] U.S. Cl. .................................. 33/562; 33/180 R; 33/189; 30/358
[58] Field of Search ................. 33/173, 174 G, 180 R, 33/189, 411, 485, DIG. 10; 30/358, 361

[56] References Cited

U.S. PATENT DOCUMENTS

| D. 230,628 | 3/1974 | Sunley | 33/DIG. 10 |
|---|---|---|---|
| 1,046,187 | 12/1912 | Hernlund | 33/189 |
| 1,665,400 | 4/1928 | Bittner | 33/174 G |
| 2,659,980 | 11/1953 | Dunn | 33/174 G |
| 2,887,776 | 5/1959 | Eisner | 33/174 G |
| 3,169,320 | 11/1961 | Currie | 33/180 R |
| 3,628,253 | 12/1971 | Shepard | 33/189 |
| 3,678,588 | 7/1972 | Isola et al. | 33/174 G |
| 3,834,033 | 9/1974 | Pinkard | 33/174 G |
| 3,888,068 | 6/1975 | Zambrano | 30/358 |
| 4,054,396 | 10/1977 | Cassidy | 33/DIG. 10 |
| 4,212,108 | 7/1980 | Jackson | 33/174 G |

Primary Examiner—Richard R. Stearns
Attorney, Agent, or Firm—Schmidt, Johnson, Hovey & Williams

[57] ABSTRACT

In the layout of the location of studs for wall framing a template is provided to eliminate the tedious, time-consuming and oftentimes inaccurate procedure of using carpenter's squares, rules and the like with accompanying pencil marks. The template uses a number of blocks slidable along a blade provided with a rule scale, each releasably held in place by a thumb screw. Each block has a pair of parallel cutting edges for scribing the stringers thereacross by the simple expedient of tapping the blocks with a hammer, such that, during assembly of the framework, each stud need merely be held between a pair of marks inscribed into the stringer while nailing the stud in place.

6 Claims, 5 Drawing Figures

U.S. Patent  Jul. 9, 1985  4,527,337
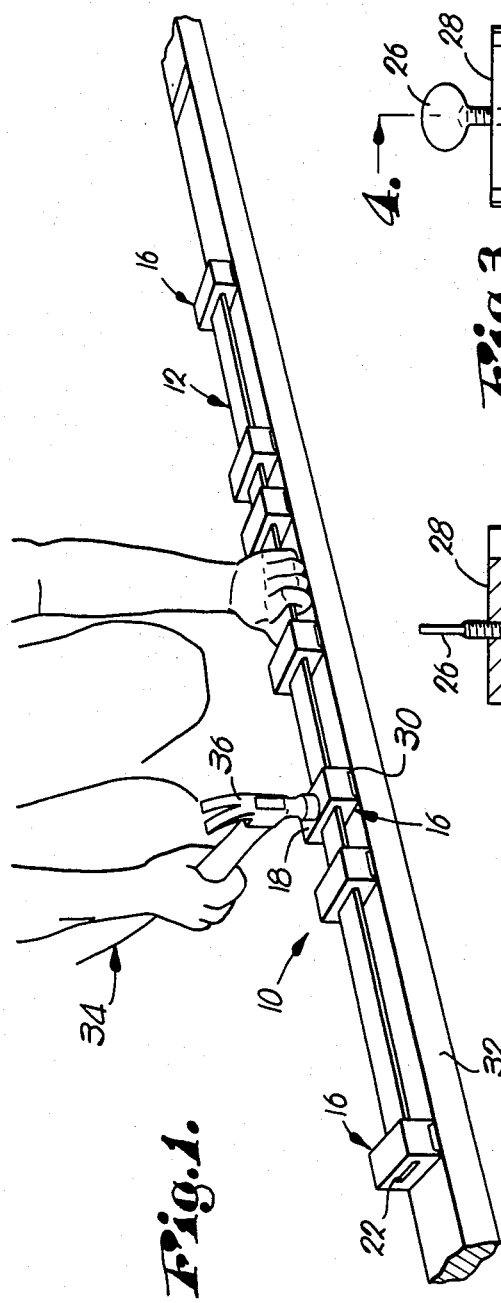
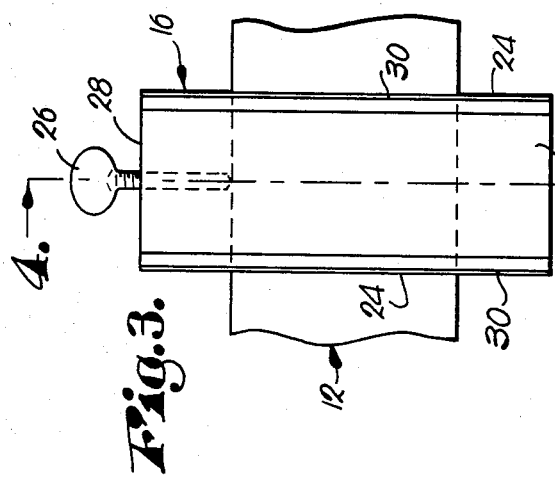
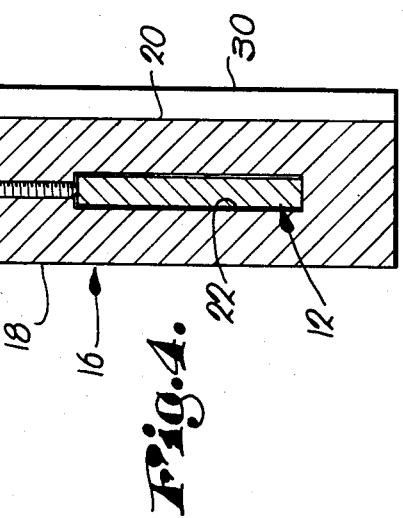
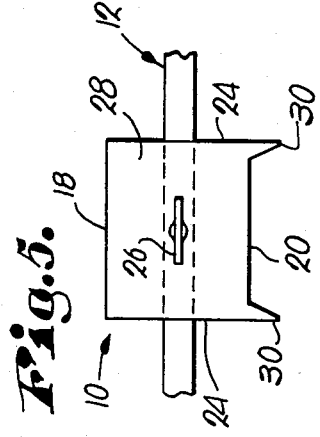
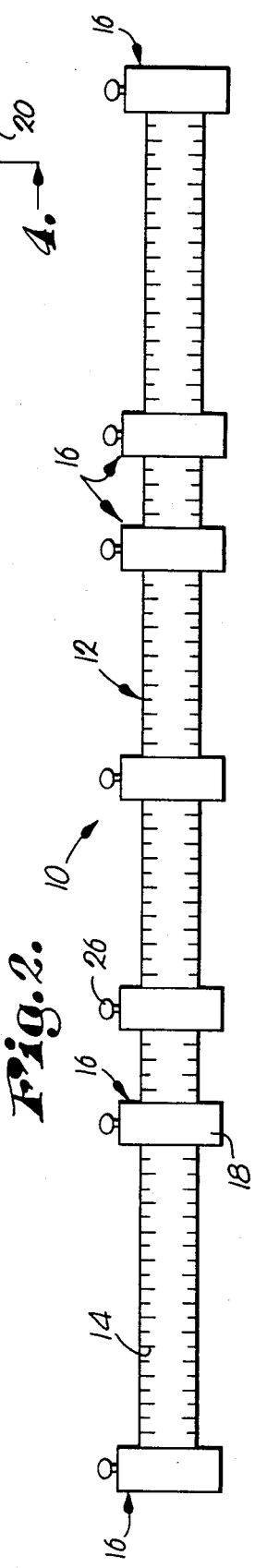

FRAMING STUD TEMPLATE

It is common practice for carpenters to lay out stud locations for the framework of building walls by slowly and meticulously measuring the desired distances between the stud centers and providing the necessary pencil marks. With the use of my template, on the other hand, pairs of spaced markings are scribed on the stringers, significantly reducing mistakes and speeding up the steps of nailing the studs in place.

Through use of a rule in the nature of a long blade and the provision of a series of marking blocks on the rule, I am able to not only simplify the layout task but insure accuracy and reduce the time required. Each block, slidable along the blade, may be preset beforehand and locked in place by a thumb screw. Thereafter, the template is laid in place on the stringer followed by a light tap on each block so that its spaced cutting edges scribe the stringer, vividly indicating the stud location.

In the drawing:

FIG. 1 is a fragmentary perspective view showing the framing stud template of my present invention in use;

FIG. 2 is a top plan view thereof;

FIG. 3 is an enlarged, fragmentary, bottom plan view showing one of the slide blocks;

FIG. 4 is a cross sectional view taken along line 4—4 of FIG. 3; and

FIG. 5 is an enlarged, fragmentary side elevational view showing one of the blocks.

The instrument or tool 10 illustrated in the drawing is in the nature of a carpenter's template for laying studding locations along the stringers of the wall framing of a building. It is adaptable for production from wood, metal or plastic and includes an elongated blade or support 12 of any desired length in the range, for example, of about 33 to 50 inches. It may advantageously be about one-half inch thick and two inches wide with a rule scale of preselected graduations 14 (and appropriate indicia, not shown) stamped on its normally upper face as seen in FIG. 2.

A plurality of spaced, polygonal, marking blocks 16 (which may be identical) are mounted on the blade 12 for longitudinal reciprocation therealong. Each block 16 has a top 18, a bottom 20, a slot 22 therethrough from sides 24, 24 and a thumb screw 26 extending from one of its ends 28 into the slot 24. Each block 16 is also provided with a pair of spaced, chisel-like formations on its bottom 20 beveled to present parallel cutting edges 30 spanning the distance between the sides 24, 24. The lengths of the edges 30 are substantially the same as or at least as long as the width of the stringers 32 with which the tool 10 is to be used. The distance between the edges 30 should be about the same as the thicknesses of the studs (not shown) to be nailed to the stringer 32. In FIG. 1, a workman 34 is shown tapping the top 18 of one of the blocks 16 by use of a hammer 36 to cause the corresponding edges 30 to scribe the stringer 32 thereacross.

As best seen in FIG. 4, the blade 12 is transversely rectangular; accordingly, the slot 32 is complementally shaped, permitting the blocks 16 to slide longitudinally of the blade 12 and to be releasably held in place by tight engagement of the screw 26 with the proximal edge of the blade 12.

In use, the blocks 16 are preset on the blade 12 by the aid of the rule scale of the latter in accordance with the spacings between the studs to be associated with the stringers 32. The distances between the blocks 16 prior to clamping them to the blade 12 by use of the screws 26 may be the same or varied, all depending upon the nature of the wall to be initially framed.

The tool 10 is then laid in place above the stringer 32 with all edges 30 engaging one face of the stringer 32 as shown in FIG. 1. One or more of the blocks 16 are then gently struck with the hammer 36 to inscribe the desired stud markings across the stringer 32. The procedure is continued throughout the lengths of the upper and lower stringers 32 to which a plurality of studs are subsequently attached.

The entire laying of the studding locations is, therefore, greatly simplified over commonplace use of carpenter's squares and other measuring instruments. No pencils or other markers are needed and the scored lines across the stringers 32 will not become easily obliterated. They are also quickly formed, easily seen and permit the workman to set the studs precisely in place between the pairs of lines formed by the sets of chisel-like edges 30. Moreover, the blade 20 may be used for other measurements, with or without the blocks 16 mounted thereon.

I claim:

1. A carpenter's template for repetitively laying a series of studding locations along the stringers of the wall framing of a building, said template comprising:
   an elongated support; and
   a plurality of spaced, solid blocks mounted on said support,
   each block having a pair of flat, parallel sides, a pair of flat, parallel ends, a flat top normal to the sides and the ends, a flat bottom parallel to the top and a pair of spaced, solid, elongated cutters integral with the block, each cutter having a length at least equal to the width of the studding, and equal to the lengths of said sides,
   each cutter being chisel-like and extending downwardly from the bottom such that a lower recess is formed in each block bounded by said cutters and said bottom,
   each cutter converging downwardly to an elongated cutting edge,
   said edges being spaced substantially equal to the thickness of the studding, whereby the cutters scribe the stringers in response to light tapping hammer blows directly struck on the tops of the blocks.

2. The invention of claim 1, said blocks being shiftable along the support longitudinally of the latter for varying the distances between the studdings.

3. The invention of claim 2, each block having releasable means for holding the same against shifting along the support.

4. The invention of claim 2, the support being transversely rectangular, each block having a complemental support-receiving slot therethrough for rendering the same slidable relative to the support.

5. The invention of claim 4, said support having a pair of opposed, longitudinal edges, each block having a thumb screw engageable with one of said edges for releasably holding the same against sliding along the support.

6. The invention of claim 5, said support being a graduated measuring instrument.

* * * * *